US009638835B2

(12) United States Patent
Chen

(10) Patent No.: US 9,638,835 B2
(45) Date of Patent: May 2, 2017

(54) ASYMMETRIC ABERRATION CORRECTING LENS

(71) Applicant: Microsoft Technology Licensing, LLC, Redmond, WA (US)

(72) Inventor: Liying Chen, Redmond, WA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 0 days.

(21) Appl. No.: 13/786,233

(22) Filed: Mar. 5, 2013

(65) Prior Publication Data
US 2014/0254032 A1   Sep. 11, 2014

(51) Int. Cl.
*G02B 3/02* (2006.01)
*G02B 3/00* (2006.01)
*H04N 5/225* (2006.01)
*F21V 8/00* (2006.01)

(52) U.S. Cl.
CPC ............ *G02B 3/00* (2013.01); *H04N 5/2254* (2013.01); *G02B 6/0046* (2013.01)

(58) Field of Classification Search
CPC .. G02B 3/00; G02B 36/0046; G02B 27/0172; G02B 5/02; H04N 5/2254; G03B 17/17
USPC ............................ 359/557, 637–748; 386/69
See application file for complete search history.

(56) References Cited

U.S. PATENT DOCUMENTS

| | | | |
|---|---|---|---|
| 4,046,975 A | 9/1977 | Seeger, Jr. | |
| 4,065,649 A | 12/1977 | Carter et al. | |
| 4,239,338 A | 12/1980 | Borrelli et al. | |
| 4,243,861 A | 1/1981 | Strandwitz | |
| 4,302,648 A | 11/1981 | Sado et al. | |
| 4,317,013 A | 2/1982 | Larson | |
| 4,365,130 A | 12/1982 | Christensen | |
| 4,492,829 A | 1/1985 | Rodrique | |
| 4,527,021 A | 7/1985 | Morikawa et al. | |
| 4,559,426 A | 12/1985 | Van Zeeland et al. | |
| 4,576,436 A | 3/1986 | Daniel | |
| 4,588,187 A | 5/1986 | Dell | |
| 4,607,147 A | 8/1986 | Ono et al. | |
| 4,615,579 A | 10/1986 | Whitehead | |

(Continued)

FOREIGN PATENT DOCUMENTS

| | | |
|---|---|---|
| CN | 1352767 | 6/2002 |
| CN | 1440513 | 9/2003 |

(Continued)

OTHER PUBLICATIONS

Burge, et al., "Determination of off-axis aberrations of imaging systems using on-axis measurements", Retrieved at <<http://www.loft.optics.arizona.edu/documents/journal_articles/Jim_Burge_Determination_of_off-axis_aberrations_of_imaging_systems_using_on-axis_measurements.pdf>>, SPIE Proceeding, Sep. 21, 2011, pp. 10.

(Continued)

*Primary Examiner* — Scott J Sugarman
*Assistant Examiner* — Mustak Choudhury

(57) ABSTRACT

An asymmetric aberration correcting lens is described. In one or more implementations, a lens includes multiple lens elements that are configured to focus an image from an imaging component. The multiple lens elements include an optical lens element that is configured to redirect the image so that the image passes through the lens. Further, the multiple lens elements include an asymmetric element configured to correct asymmetric aberration caused by the imaging component.

20 Claims, 5 Drawing Sheets

(56) References Cited

U.S. PATENT DOCUMENTS

| | | |
|---|---|---|
| 4,651,133 A | 3/1987 | Ganesan et al. |
| 5,220,521 A | 6/1993 | Kikinis |
| 5,283,559 A | 2/1994 | Kalendra et al. |
| 5,331,443 A | 7/1994 | Stanisci |
| 5,339,382 A | 8/1994 | Whitehead |
| 5,406,415 A | 4/1995 | Kelly |
| 5,548,477 A | 8/1996 | Kumar et al. |
| 5,558,577 A | 9/1996 | Kato |
| 5,681,220 A | 10/1997 | Bertram et al. |
| 5,745,376 A | 4/1998 | Barker et al. |
| 5,748,114 A | 5/1998 | Koehn |
| 5,781,406 A | 7/1998 | Hunte |
| 5,807,175 A | 9/1998 | Davis et al. |
| 5,818,361 A | 10/1998 | Acevedo |
| 5,828,770 A | 10/1998 | Leis et al. |
| 5,861,990 A | 1/1999 | Tedesco |
| 5,874,697 A | 2/1999 | Selker et al. |
| 5,926,170 A | 7/1999 | Oba |
| 5,971,635 A | 10/1999 | Wise |
| 5,999,147 A | 12/1999 | Teitel |
| 6,002,389 A | 12/1999 | Kasser |
| 6,005,209 A | 12/1999 | Burleson et al. |
| 6,012,714 A | 1/2000 | Worley et al. |
| 6,040,823 A | 3/2000 | Seffernick et al. |
| 6,044,717 A | 4/2000 | Biegelsen et al. |
| 6,046,857 A | 4/2000 | Morishima et al. |
| 6,061,644 A | 5/2000 | Leis |
| 6,178,443 B1 | 1/2001 | Lin |
| 6,195,136 B1 | 2/2001 | Handschy et al. |
| 6,232,934 B1 | 5/2001 | Heacock et al. |
| 6,238,078 B1 | 5/2001 | Hed |
| 6,254,105 B1 | 7/2001 | Rinde et al. |
| 6,279,060 B1 | 8/2001 | Luke et al. |
| 6,300,986 B1 | 10/2001 | Travis |
| 6,329,617 B1 | 12/2001 | Burgess |
| 6,342,871 B1 * | 1/2002 | Takeyama ............ 345/7 |
| 6,344,791 B1 | 2/2002 | Armstrong |
| 6,353,503 B1 | 3/2002 | Spitzer et al. |
| 6,362,861 B1 | 3/2002 | Hertz et al. |
| 6,380,497 B1 | 4/2002 | Hashimoto et al. |
| 6,437,682 B1 | 8/2002 | Vance |
| 6,469,755 B1 | 10/2002 | Adachi et al. |
| 6,511,378 B1 | 1/2003 | Bhatt et al. |
| 6,532,147 B1 | 3/2003 | Christ, Jr. |
| 6,543,949 B1 | 4/2003 | Ritchey et al. |
| 6,565,439 B2 | 5/2003 | Shinohara et al. |
| 6,600,121 B1 | 7/2003 | Olodort et al. |
| 6,603,408 B1 | 8/2003 | Gaba |
| 6,617,536 B2 | 9/2003 | Kawaguchi |
| 6,685,369 B2 | 2/2004 | Lien |
| 6,704,864 B1 | 3/2004 | Philyaw |
| 6,721,019 B2 | 4/2004 | Kono et al. |
| 6,725,318 B1 | 4/2004 | Sherman et al. |
| 6,774,888 B1 | 8/2004 | Genduso |
| 6,776,546 B2 | 8/2004 | Kraus et al. |
| 6,784,869 B1 | 8/2004 | Clark et al. |
| 6,795,146 B2 | 9/2004 | Dozov et al. |
| 6,813,143 B2 | 11/2004 | Makela |
| 6,819,316 B2 | 11/2004 | Schulz et al. |
| 6,833,955 B2 | 12/2004 | Niv |
| 6,847,488 B2 | 1/2005 | Travis |
| 6,856,506 B2 | 2/2005 | Doherty et al. |
| 6,861,961 B2 | 3/2005 | Sandbach et al. |
| 6,914,197 B2 | 7/2005 | Doherty et al. |
| 6,950,950 B2 | 9/2005 | Sawyers et al. |
| 6,970,957 B1 | 11/2005 | Oshins et al. |
| 6,976,799 B2 | 12/2005 | Kim et al. |
| 7,007,238 B2 | 2/2006 | Glaser |
| 7,025,908 B1 | 4/2006 | Hayashi et al. |
| 7,051,149 B2 | 5/2006 | Wang et al. |
| 7,058,252 B2 | 6/2006 | Woodgate et al. |
| 7,066,634 B2 | 6/2006 | Kitamura et al. |
| 7,091,436 B2 | 8/2006 | Serban |
| 7,101,048 B2 | 9/2006 | Travis |
| 7,106,222 B2 | 9/2006 | Ward et al. |
| 7,123,292 B1 | 10/2006 | Seeger et al. |
| 7,152,985 B2 | 12/2006 | Benitez et al. |
| 7,194,662 B2 | 3/2007 | Do et al. |
| 7,199,931 B2 | 4/2007 | Boettiger et al. |
| 7,213,991 B2 | 5/2007 | Chapman et al. |
| 7,218,830 B2 | 5/2007 | Iimura |
| 7,277,087 B2 | 10/2007 | Hill et al. |
| 7,400,805 B2 | 7/2008 | Abu-Ageel |
| 7,447,934 B2 | 11/2008 | Dasari et al. |
| 7,469,386 B2 | 12/2008 | Bear et al. |
| 7,481,566 B2 | 1/2009 | Han |
| 7,499,037 B2 | 3/2009 | Lube |
| 7,499,216 B2 | 3/2009 | Niv et al. |
| 7,502,803 B2 | 3/2009 | Culter et al. |
| 7,515,143 B2 | 4/2009 | Keam et al. |
| 7,542,052 B2 | 6/2009 | Solomon et al. |
| 7,558,594 B2 | 7/2009 | Wilson |
| 7,559,834 B1 | 7/2009 | York |
| 7,561,131 B2 | 7/2009 | Ijzerman et al. |
| 7,636,921 B2 | 12/2009 | Louie |
| 7,643,213 B2 | 1/2010 | Boettiger et al. |
| 7,656,392 B2 | 2/2010 | Bolender |
| 7,733,326 B1 | 6/2010 | Adiseshan |
| 7,777,972 B1 | 8/2010 | Chen et al. |
| 7,782,342 B2 | 8/2010 | Koh |
| 7,800,708 B2 | 9/2010 | Brott et al. |
| 7,813,715 B2 | 10/2010 | McKillop et al. |
| 7,855,716 B2 | 12/2010 | McCreary et al. |
| 7,884,807 B2 | 2/2011 | Hovden et al. |
| D636,397 S | 4/2011 | Green |
| 7,918,559 B2 | 4/2011 | Tesar |
| 7,928,964 B2 | 4/2011 | Kolmykov-Zotov et al. |
| 7,945,717 B2 | 5/2011 | Rivalsi |
| 7,967,462 B2 | 6/2011 | Ogiro et al. |
| 7,973,771 B2 | 7/2011 | Geaghan |
| 7,978,281 B2 | 7/2011 | Vergith et al. |
| 8,035,614 B2 | 10/2011 | Bell et al. |
| 8,035,624 B2 | 10/2011 | Bell et al. |
| 8,053,688 B2 | 11/2011 | Conzola et al. |
| 8,065,624 B2 | 11/2011 | Morin et al. |
| 8,069,356 B2 | 11/2011 | Rathi et al. |
| RE42,992 E | 12/2011 | David |
| 8,102,362 B2 | 1/2012 | Ricks et al. |
| 8,115,718 B2 | 2/2012 | Chen et al. |
| 8,130,203 B2 | 3/2012 | Westerman |
| 8,154,524 B2 | 4/2012 | Wilson et al. |
| D659,139 S | 5/2012 | Gengler |
| 8,169,421 B2 | 5/2012 | Wright et al. |
| 8,220,929 B2 | 7/2012 | Miyawaki et al. |
| 8,229,509 B2 | 7/2012 | Paek et al. |
| 8,229,522 B2 | 7/2012 | Kim et al. |
| 8,243,027 B2 | 8/2012 | Hotelling et al. |
| 8,249,263 B2 | 8/2012 | Cragun |
| 8,310,768 B2 | 11/2012 | Lin et al. |
| 8,345,920 B2 | 1/2013 | Ferren et al. |
| 8,416,206 B2 | 4/2013 | Carpendale et al. |
| 8,466,902 B2 | 6/2013 | Boer et al. |
| 8,582,206 B2 | 11/2013 | Travis |
| 8,717,664 B2 | 5/2014 | Wang et al. |
| 8,749,529 B2 | 6/2014 | Powell et al. |
| 9,019,615 B2 | 4/2015 | Travis |
| 9,052,414 B2 | 6/2015 | Travis et al. |
| 9,152,173 B2 | 10/2015 | Lee et al. |
| 9,355,345 B2 | 5/2016 | Powell |
| 9,513,748 B2 | 12/2016 | Rihn et al. |
| 2002/0134828 A1 | 9/2002 | Sandbach et al. |
| 2003/0165017 A1 | 9/2003 | Amitai |
| 2003/0197687 A1 | 10/2003 | Shetter |
| 2004/0052506 A1 * | 3/2004 | Togino ............ 386/69 |
| 2004/0174709 A1 | 9/2004 | Buelow, II et al. |
| 2004/0258924 A1 | 12/2004 | Berger et al. |
| 2004/0268000 A1 | 12/2004 | Barker et al. |
| 2005/0001957 A1 | 1/2005 | Amimori et al. |
| 2005/0002073 A1 | 1/2005 | Nakamura et al. |
| 2005/0057515 A1 | 3/2005 | Bathiche |
| 2005/0059489 A1 | 3/2005 | Kim |
| 2005/0073756 A1 | 4/2005 | Poulsen |
| 2005/0084212 A1 | 4/2005 | Fein |
| 2005/0100690 A1 | 5/2005 | Mayer et al. |

(56) References Cited

U.S. PATENT DOCUMENTS

| | | |
|---|---|---|
| 2005/0146512 A1 | 7/2005 | Hill et al. |
| 2005/0264653 A1 | 12/2005 | Starkweather et al. |
| 2005/0264988 A1 | 12/2005 | Nicolosi |
| 2006/0002101 A1 | 1/2006 | Wheatley et al. |
| 2006/0028400 A1 | 2/2006 | Lapstun et al. |
| 2006/0085658 A1 | 4/2006 | Allen et al. |
| 2006/0125799 A1 | 6/2006 | Hillis et al. |
| 2006/0154725 A1 | 7/2006 | Glaser et al. |
| 2006/0156415 A1 | 7/2006 | Rubinstein et al. |
| 2006/0181514 A1 | 8/2006 | Newman |
| 2006/0195522 A1 | 8/2006 | Miyazaki |
| 2006/0227393 A1 | 10/2006 | Herloski |
| 2006/0238550 A1 | 10/2006 | Page |
| 2006/0239006 A1 | 10/2006 | Chaves et al. |
| 2006/0279501 A1 | 12/2006 | Lu et al. |
| 2007/0002587 A1 | 1/2007 | Miyashita |
| 2007/0047260 A1 | 3/2007 | Lee et al. |
| 2007/0062089 A1 | 3/2007 | Homer et al. |
| 2007/0072474 A1 | 3/2007 | Beasley et al. |
| 2007/0126994 A1 | 6/2007 | Hwang |
| 2007/0153545 A1 | 7/2007 | Lee |
| 2007/0182663 A1 | 8/2007 | Biech |
| 2007/0189667 A1 | 8/2007 | Wakita et al. |
| 2007/0223248 A1 | 9/2007 | Han |
| 2007/0234420 A1 | 10/2007 | Novotney et al. |
| 2007/0236408 A1 | 10/2007 | Yamaguchi et al. |
| 2007/0247432 A1 | 10/2007 | Oakley |
| 2007/0260892 A1 | 11/2007 | Paul et al. |
| 2007/0279744 A1* | 12/2007 | Fujimoto ........... G02B 27/0172 359/557 |
| 2007/0283179 A1 | 12/2007 | Burnett et al. |
| 2008/0005423 A1 | 1/2008 | Jacobs et al. |
| 2008/0080166 A1 | 4/2008 | Duong et al. |
| 2008/0088593 A1 | 4/2008 | Smoot |
| 2008/0094398 A1 | 4/2008 | Ng et al. |
| 2008/0104437 A1 | 5/2008 | Lee |
| 2008/0122803 A1 | 5/2008 | Izadi et al. |
| 2008/0150913 A1 | 6/2008 | Bell et al. |
| 2008/0151478 A1 | 6/2008 | Chern |
| 2008/0158185 A1 | 7/2008 | Westerman |
| 2008/0179507 A2 | 7/2008 | Han |
| 2008/0225205 A1 | 9/2008 | Travis |
| 2008/0238871 A1 | 10/2008 | Tam |
| 2008/0238884 A1 | 10/2008 | Harish |
| 2008/0253822 A1 | 10/2008 | Matias |
| 2008/0316002 A1 | 12/2008 | Brunet et al. |
| 2008/0320190 A1 | 12/2008 | Lydon et al. |
| 2009/0009476 A1 | 1/2009 | Daley, III |
| 2009/0033623 A1 | 2/2009 | Lin |
| 2009/0067156 A1 | 3/2009 | Bonnett et al. |
| 2009/0073957 A1 | 3/2009 | Newland et al. |
| 2009/0096738 A1 | 4/2009 | Chen et al. |
| 2009/0140985 A1 | 6/2009 | Liu |
| 2009/0142020 A1 | 6/2009 | Van Ostrand et al. |
| 2009/0167718 A1 | 7/2009 | Lee et al. |
| 2009/0189974 A1 | 7/2009 | Deering |
| 2009/0200384 A1 | 8/2009 | Masalkar |
| 2009/0251008 A1 | 10/2009 | Sugaya |
| 2009/0262492 A1 | 10/2009 | Whitchurch et al. |
| 2009/0303204 A1 | 12/2009 | Nasiri et al. |
| 2009/0320244 A1 | 12/2009 | Lin |
| 2009/0321490 A1 | 12/2009 | Groene et al. |
| 2010/0001963 A1 | 1/2010 | Doray et al. |
| 2010/0026656 A1 | 2/2010 | Hotelling et al. |
| 2010/0038821 A1 | 2/2010 | Jenkins et al. |
| 2010/0045633 A1 | 2/2010 | Gettemy |
| 2010/0051432 A1 | 3/2010 | Lin et al. |
| 2010/0053534 A1 | 3/2010 | Hsieh et al. |
| 2010/0053771 A1 | 3/2010 | Travis et al. |
| 2010/0072351 A1 | 3/2010 | Mahowald |
| 2010/0077237 A1 | 3/2010 | Sawyers |
| 2010/0085321 A1 | 4/2010 | Pundsack |
| 2010/0102206 A1 | 4/2010 | Cazaux et al. |
| 2010/0103112 A1 | 4/2010 | Yoo et al. |
| 2010/0149073 A1 | 6/2010 | Chaum et al. |
| 2010/0149100 A1 | 6/2010 | Meiby |
| 2010/0149111 A1 | 6/2010 | Olien |
| 2010/0149117 A1 | 6/2010 | Chien et al. |
| 2010/0161522 A1 | 6/2010 | Tirpak et al. |
| 2010/0164857 A1 | 7/2010 | Liu et al. |
| 2010/0171891 A1 | 7/2010 | Kaji et al. |
| 2010/0174421 A1 | 7/2010 | Tsai et al. |
| 2010/0177388 A1 | 7/2010 | Cohen et al. |
| 2010/0180063 A1 | 7/2010 | Ananny et al. |
| 2010/0188299 A1 | 7/2010 | Rinehart et al. |
| 2010/0206614 A1 | 8/2010 | Park et al. |
| 2010/0214659 A1 | 8/2010 | Levola |
| 2010/0222110 A1 | 9/2010 | Kim et al. |
| 2010/0250988 A1 | 9/2010 | Okuda et al. |
| 2010/0274932 A1 | 10/2010 | Kose |
| 2010/0279768 A1 | 11/2010 | Huang et al. |
| 2010/0282953 A1 | 11/2010 | Tam |
| 2010/0284085 A1 | 11/2010 | Laakkonen |
| 2010/0289457 A1 | 11/2010 | Onnerud et al. |
| 2010/0295812 A1 | 11/2010 | Burns et al. |
| 2010/0296163 A1 | 11/2010 | Saarikko |
| 2010/0302378 A1 | 12/2010 | Marks et al. |
| 2010/0302469 A1 | 12/2010 | Yue et al. |
| 2010/0306538 A1 | 12/2010 | Thomas et al. |
| 2010/0308778 A1 | 12/2010 | Yamazaki et al. |
| 2010/0308844 A1 | 12/2010 | Day et al. |
| 2010/0315348 A1 | 12/2010 | Jellicoe et al. |
| 2010/0325155 A1 | 12/2010 | Skinner et al. |
| 2011/0002577 A1 | 1/2011 | Van Ostrand |
| 2011/0007047 A1 | 1/2011 | Fujioka et al. |
| 2011/0012873 A1 | 1/2011 | Prest et al. |
| 2011/0019123 A1 | 1/2011 | Prest et al. |
| 2011/0031287 A1 | 2/2011 | Le Gette et al. |
| 2011/0032215 A1 | 2/2011 | Sirotich et al. |
| 2011/0035209 A1 | 2/2011 | Macfarlane |
| 2011/0037721 A1 | 2/2011 | Cranfill et al. |
| 2011/0043479 A1 | 2/2011 | van Aerle et al. |
| 2011/0043990 A1 | 2/2011 | Mickey et al. |
| 2011/0044579 A1 | 2/2011 | Travis et al. |
| 2011/0060926 A1 | 3/2011 | Brooks et al. |
| 2011/0069148 A1 | 3/2011 | Jones et al. |
| 2011/0072391 A1 | 3/2011 | Hanggie et al. |
| 2011/0074688 A1 | 3/2011 | Hull et al. |
| 2011/0096035 A1 | 4/2011 | Shen |
| 2011/0102326 A1 | 5/2011 | Casparian et al. |
| 2011/0122071 A1 | 5/2011 | Powell |
| 2011/0134032 A1 | 6/2011 | Chiu et al. |
| 2011/0163955 A1 | 7/2011 | Nasiri et al. |
| 2011/0164370 A1 | 7/2011 | McClure et al. |
| 2011/0167181 A1 | 7/2011 | Minoo et al. |
| 2011/0167287 A1 | 7/2011 | Walsh et al. |
| 2011/0167391 A1 | 7/2011 | Momeyer et al. |
| 2011/0169778 A1 | 7/2011 | Nungester et al. |
| 2011/0170289 A1 | 7/2011 | Allen et al. |
| 2011/0179864 A1 | 7/2011 | Raasch et al. |
| 2011/0184646 A1 | 7/2011 | Wong et al. |
| 2011/0193787 A1 | 8/2011 | Morishige et al. |
| 2011/0197156 A1 | 8/2011 | Strait et al. |
| 2011/0205372 A1 | 8/2011 | Miramontes |
| 2011/0216039 A1 | 9/2011 | Chen et al. |
| 2011/0227913 A1 | 9/2011 | Hyndman |
| 2011/0234535 A1 | 9/2011 | Hung et al. |
| 2011/0235179 A1 | 9/2011 | Simmonds |
| 2011/0242440 A1 | 10/2011 | Noma et al. |
| 2011/0242670 A1 | 10/2011 | Simmonds |
| 2011/0248920 A1 | 10/2011 | Larsen |
| 2011/0290686 A1 | 12/2011 | Huang |
| 2011/0291993 A1 | 12/2011 | Miyazaki |
| 2011/0297566 A1 | 12/2011 | Gallagher et al. |
| 2011/0304577 A1 | 12/2011 | Brown et al. |
| 2011/0304815 A1 | 12/2011 | Newell |
| 2011/0316807 A1 | 12/2011 | Corrion |
| 2011/0317399 A1 | 12/2011 | Hsu |
| 2012/0007821 A1 | 1/2012 | Zaliva |
| 2012/0023459 A1 | 1/2012 | Westerman |
| 2012/0024682 A1 | 2/2012 | Huang et al. |
| 2012/0044179 A1 | 2/2012 | Hudson |
| 2012/0047368 A1 | 2/2012 | Chinn et al. |
| 2012/0050975 A1 | 3/2012 | Garelli et al. |

(56) References Cited

U.S. PATENT DOCUMENTS

| | | |
|---|---|---|
| 2012/0062850 A1 | 3/2012 | Travis |
| 2012/0068919 A1 | 3/2012 | Lauder et al. |
| 2012/0075249 A1 | 3/2012 | Hoch |
| 2012/0075256 A1 | 3/2012 | Izadi et al. |
| 2012/0092279 A1 | 4/2012 | Martin |
| 2012/0094257 A1 | 4/2012 | Pillischer et al. |
| 2012/0098872 A1 | 4/2012 | Kim et al. |
| 2012/0099749 A1 | 4/2012 | Rubin et al. |
| 2012/0102436 A1 | 4/2012 | Nurmi |
| 2012/0102438 A1 | 4/2012 | Robinson et al. |
| 2012/0113031 A1 | 5/2012 | Lee et al. |
| 2012/0113223 A1 | 5/2012 | Hilliges et al. |
| 2012/0117409 A1 | 5/2012 | Lee et al. |
| 2012/0127118 A1 | 5/2012 | Nolting et al. |
| 2012/0140396 A1 | 6/2012 | Zeliff et al. |
| 2012/0145525 A1 | 6/2012 | Ishikawa |
| 2012/0146943 A1 | 6/2012 | Fairley et al. |
| 2012/0162088 A1 | 6/2012 | van Lieshout et al. |
| 2012/0162126 A1 | 6/2012 | Yuan et al. |
| 2012/0162693 A1 | 6/2012 | Ito |
| 2012/0170284 A1 | 7/2012 | Shedletsky |
| 2012/0182242 A1 | 7/2012 | Lindahl et al. |
| 2012/0182743 A1 | 7/2012 | Chou |
| 2012/0188243 A1 | 7/2012 | Fujii et al. |
| 2012/0194448 A1 | 8/2012 | Rothkopf |
| 2012/0195063 A1 | 8/2012 | Kim et al. |
| 2012/0200532 A1 | 8/2012 | Powell et al. |
| 2012/0224073 A1 | 9/2012 | Miyahara |
| 2012/0243102 A1 | 9/2012 | Takeda et al. |
| 2012/0243204 A1 | 9/2012 | Robinson |
| 2012/0246377 A1 | 9/2012 | Bhesania |
| 2012/0256959 A1 | 10/2012 | Ye et al. |
| 2012/0268912 A1 | 10/2012 | Minami et al. |
| 2012/0274811 A1 | 11/2012 | Bakin |
| 2012/0300275 A1 | 11/2012 | Vilardell et al. |
| 2013/0027354 A1 | 1/2013 | Yabuta et al. |
| 2013/0063873 A1 | 3/2013 | Wodrich et al. |
| 2013/0106813 A1 | 5/2013 | Hotelling et al. |
| 2013/0107572 A1 | 5/2013 | Holman et al. |
| 2013/0120760 A1 | 5/2013 | Raguin et al. |
| 2013/0181926 A1 | 7/2013 | Lim |
| 2013/0201094 A1 | 8/2013 | Travis |
| 2013/0207896 A1 | 8/2013 | Robinson et al. |
| 2013/0222353 A1 | 8/2013 | Large |
| 2013/0229357 A1 | 9/2013 | Powell |
| 2013/0265220 A1 | 10/2013 | Fleischmann et al. |
| 2013/0329301 A1 | 12/2013 | Travis |
| 2013/0332628 A1 | 12/2013 | Panay |
| 2014/0022629 A1 | 1/2014 | Powell |
| 2014/0098085 A1 | 4/2014 | Lee |
| 2014/0168131 A1 | 6/2014 | Rihn |
| 2014/0233237 A1 | 8/2014 | Lutian |
| 2015/0177497 A1 | 6/2015 | Travis |

FOREIGN PATENT DOCUMENTS

| | | |
|---|---|---|
| CN | 102047155 | 5/2011 |
| CN | 102147643 | 8/2011 |
| EP | 0271956 | 6/1988 |
| EP | 2353978 | 8/2011 |
| EP | 2381290 | 10/2011 |
| EP | 2400365 | 12/2011 |
| JP | 10301055 | 11/1998 |
| JP | 10326124 | 12/1998 |
| JP | 2001174746 | 6/2001 |
| JP | 2009003053 | 1/2009 |
| JP | 2009122551 | 6/2009 |
| KR | 20110064265 | 6/2011 |
| WO | 9964784 A1 | 12/1999 |
| WO | 0079327 A1 | 12/2000 |
| WO | WO-2011016200 | 2/2011 |
| WO | WO-2012063410 | 5/2012 |

OTHER PUBLICATIONS

"Accessing Device Sensors", retrieved from <https://developer.palm.com/content/api/dev-guide/pdk/accessing-device-sensors.html> on May 25, 2012, 4 pages.

"ACPI Docking for Windows Operating Systems", Retrieved from: <http://www.scritube.com/limba/engleza/software/ACPI-Docking-for-Windows-Opera331824193.php> on Jul. 6, 2010, 10 pages.

"Cirago Slim Case®—Protective case with built-in kickstand for your iPhone 5®", Retrieved from <http://cirago.com/wordpress/wp-content/uploads/2012/10/ipc1500brochure1.pdf> on Jan. 29, 2013, (Jan. 2013), 1 page.

"First One Handed Fabric Keyboard with Bluetooth Wireless Technology", Retrieved from: <http://press.xtvworld.com/article3817.html> on May 8, 2012,(Jan. 6, 2005), 2 pages.

"For Any Kind of Proceeding 2011 Springtime as Well as Coil Nailers as Well as Hotter Summer Season", *Lady Shoe Worlds*, retrieved from <http://www.ladyshoesworld.com/2011/09/18/for-any-kind-of-proceeding-2011-springtime-as-well-as-coil-nailers-as-well-as-hotter-summer-season/> on Nov. 3, 2011,(Sep. 8, 2011), 2 pages.

"Force and Position Sensing Resistors: An Emerging Technology", *Interlink Electronics*, Available at <http://staff.science.uva.nl/~vlaander/docu/FSR/An__Exploring__Technology.pdf>,(Feb. 1990), pp. 1-6.

"Frogpad Introduces Weareable Fabric Keyboard with Bluetooth Technology", Retrieved from: <http://www.geekzone.co.nz/content.asp?contentid=3898> on May 7, 2012,(Jan. 7, 2005), 3 pages.

"Incipio LG G-Slate Premium Kickstand Case—Black Nylon", Retrieved from: <http://www.amazon.com/Incipio-G-Slate-Premium-Kickstand-Case/dp/B004ZKP916> on May 8, 2012, 4 pages.

"International Search Report and Written Opinion", International Application No. PCT/US2011/050471, (Apr. 9, 2012), 8 pages.

"Membrane Keyboards & Membrane Keypads", Retrieved from: <http://www.pannam.com/> on May 9, 2012,(Mar. 4, 2009), 2 pages.

"Microsoft Develops Glasses-Free Eye-Tracking 3D Display", *Tech-FAQ*, retrieved from <http://www.tech-faq.com/microsoft-develops-glasses-free-eye-tracking-3d-display.html> on Nov. 2, 2011, 3 pages.

"Microsoft Reveals Futuristic 3D Virtual HoloDesk Patent", Retrieved from <http://www.patentbolt.com/2012/05/microsoft-reveals-futuristic-3d-virtual-holodesk-patent.htmlt> on May 28, 2012, (May 23, 2012), 9 pages.

"Motion Sensors", *Android Developers*, retrieved from <http://developer.android.com/guide/topics/sensors/sensors_motion.html> on May 25, 2012, 7 pages.

"Non-Final Office Action", U.S. Appl. No. 12/882,994, (Feb. 1, 2013),17 pages.

"Non-Final Office Action", U.S. Appl. No. 13/471,001, (Feb. 19, 2013),15 pages.

"Non-Final Office Action", U.S. Appl. No. 13/471,139, (Mar. 21, 2013),12 pages.

"Non-Final Office Action", U.S. Appl. No. 13/471,202, (Feb. 11, 2013),10 pages.

"Non-Final Office Action", U.S. Appl. No. 13/471,336, (Jan. 18, 2013),14 pages.

"Non-Final Office Action", U.S. Appl. No. 13/651,195, (Jan. 2, 2013),14 pages.

"Non-Final Office Action", U.S. Appl. No. 13/651,232, (Jan. 17, 2013),15 pages.

"Non-Final Office Action", U.S. Appl. No. 13/651,272, (Feb. 12, 2013),10 pages.

"Non-Final Office Action", U.S. Appl. No. 13/651,287, (Jan. 29, 2013),13 pages.

"Non-Final Office Action", U.S. Appl. No. 13/651,304, (Mar. 22, 2013), 9 pages.

"Non-Final Office Action", U.S. Appl. No. 13/651,327, (Mar. 22, 2013), 6 pages.

"Non-Final Office Action", U.S. Appl. No. 13/651,871, (Mar. 18, 2013),14 pages.

(56) References Cited

OTHER PUBLICATIONS

"Non-Final Office Action", U.S. Appl. No. 13/651,976, (Feb. 22, 2013),16 pages.
"Non-Final Office Action", U.S. Appl. No. 13/653,321, (Feb. 1, 2013),13 pages.
"Non-Final Office Action", U.S. Appl. No. 13/653,682, (Feb. 7, 2013),11 pages.
"Notice of Allowance", U.S. Appl. No. 13/470,633, (Mar. 22, 2013), 7 pages.
"Position Sensors", *Android Developers*, retrieved from <http://developer.android.com/guide/topics/sensors/sensors_position.html>on May 25, 2012, 5 pages.
"Restriction Requirement", U.S. Appl. No. 13/471,139, (Jan. 17, 2013), 7 pages.
"Restriction Requirement", U.S. Appl. No. 13/651,304, (Jan. 18, 2013), 7 pages.
"Restriction Requirement", U.S. Appl. No. 13/651,726, (Feb. 22, 2013), 6 pages.
"Restriction Requirement", U.S. Appl. No. 13/651,871, (Feb. 7, 2013), 6 pages.
"SolRxTM E-Series Multidirectional Phototherapy ExpandableTM 2-Bulb Full Body Panel System", Retrieved from: < http://www.solarcsystems.com/us_multidirectional_uv_light_therapy_1_intro.html > on Jul. 25, 2012,(2011), 4 pages.
"The Microsoft Surface Tablets Comes With Impressive Design and Specs", Retrieved from <http://microsofttabletreview.com/the-microsoft-surface-tablets-comes-with-impressive-design-and-specs> on Jan. 30, 2013, (Jun. 2012), 2 pages.
"Tilt Shift Lenses: Perspective Control", retrieved from http://www.cambridgeincolour.com/tutorials/tilt-shift-lenses1.htm, (Mar. 28, 2008),11 Pages.
"Virtualization Getting Started Guide", *Red Hat Enterprise Linux 6*, Edition 0.2, retrieved from <http://docs.redhat.com/docs/en-US/Red_Hat_Enterprise_Linux/6/html-single/Virtualization_Getting_Started_Guide/index.html> on Jun. 13, 2012, 24 pages.
"What is Active Alignment?", http://www.kasalis.com/active_alignment.html, retrieved on Nov. 22, 2012, 2 Pages.
Bert, et al., "Passive Matrix Addressing of Electrophoretic Image Display", *Conference on International Display Research Conference*, Retrieved from <http://www.cmst.be/publi/eurodisplay2002_s14-1.pdf>,(Oct. 1, 2002), 4 pages.
Block, Steve et al., "DeviceOrientation Event Specification", *W3C, Editor's Draft*, retrieved from <https://developer.palm.com/content/api/dev-guide/pdk/accessing-device-sensors.html> on May 25, 2012,(Jul. 12, 2011), 14 pages.
Brown, Rich "Microsoft Shows Off Pressure-Sensitive Keyboard", retrieved from <http://news.cnet.com/8301-17938_105-10304792-1.html> on May 7, 2012, (Aug. 6, 2009), 2 pages.
Butler, Alex et al., "SideSight: Multi-"touch" Interaction around Small Devices", *In the proceedings of the 21st annual ACM symposium on User interface software and technology.*, retrieved from <http://research.microsoft.com/pubs/132534/sidesight_crv3.pdf> May 29, 2012,(Oct. 19, 2008), 4 pages.
Chang, Jee-Gong et al., "Optical Design and Analysis of LCD Backlight Units Using ASAP", *Optical Engineering*, Available at <http://www.opticsvalley.com/resources/kbasePDF/ma_oe_001_optical_design.pdf>,(Jun. 2003),15 pages.
Crider, Michael "Sony Slate Concept Tablet "Grows" a Kickstand", Retrieved from: <http://androidcommunity.com/sony-slate-concept-tablet-grows-a-kickstand-20120116/> on May 4, 2012,(Jan. 16, 2012), 9 pages.
Dietz, Paul H., et al., "A Practical Pressure Sensitive Computer Keyboard", In Proceedings of UIST 2009,(Oct. 2009), 4 pages.
Diverdi, et al., "An Immaterial Pseudo-3D Display with 3D Interaction", *In the proceedings of Three-Dimensional Television: Capture, Transmission, and Display, Springer*, Retrieved from <http://www.cs.ucsb.edu/~holl/pubs/DiVerdi-2007-3DTV.pdf>, (Feb. 6, 2007), 26 pages.

Glatt, Jeff "Channel and Key Pressure (Aftertouch).", Retrieved from: <http://home.roadrunner.com/~jgglatt/tutr/touch.htm> on Jun. 11, 2012, 2 pages.
Grossman, et al., "Multi-Finger Gestural Interaction with 3D Volumetric Displays", *In the proceedings of the 17th annual ACM symposium on User interface software and technology*, Retrieved from <http://www.dgp.toronto.edu/papers/tgrossman_UIST2004.pdf>,(Oct. 24, 2004), pp. 61-70.
Hanlon, Mike "ElekTex Smart Fabric Keyboard Goes Wireless", Retrieved from: <http://www.gizmag.com/go/5048/ > on May 7, 2012,(Jan. 15, 2006), 5 pages.
Izadi, Shahram et al., "ThinSight: A Thin Form-Factor Interactive Surface Technology", *Communications of the ACM*, vol. 52, No. 12, retrieved from <http://research.microsoft.com/pubs/132532/p90-izadi.pdf> on Jan. 5, 2012,(Dec. 2009), pp. 90-98.
Kaur, Sukhmani "Vincent Liew's redesigned laptop satisfies ergonomic needs", Retrieved from: <http://www.designbuzz.com/entry/vincent-liew-s-redesigned-laptop-satisfies-ergonomic-needs/> on Jul. 27, 2012,(Jun. 21, 2010), 4 pages.
Khuntontong, Puttachat et al., "Fabrication of Molded Interconnection Devices By Ultrasonic Hot Embossing on Thin Polymer Films", IEEE Transactions on Electronics Packaging Manufacturing, vol. 32, No. 3,(Jul. 2009), pp. 152-156.
Lee, C.M.G "Flat-Panel Autostereoscopic 3D Display", *Optoelectronics, IET*, Available at <http://ieeexplore.ieee.org/stamp/stamp.jsp?arnumber=04455550>,(Feb. 2008), pp. 24-28.
Lee, et al., "Depth-Fused 3D Imagery on an Immaterial Display", *In the proceedings of IEEE Transactions On Visualization And Computer Graphics*, vol. 15, No. 1, Retrieved from <http://ieeexplore.ieee.org/stamp/stamp.jsp?arnumber=04540094>,(Jan. 2009), pp. 20-33.
Lee, et al., "LED Light Coupler Design for a Ultra Thin Light Guide", *Journal of the Optical Society of Korea*, vol. 11, Issue.3, Retrieved from <http://opticslab.kongju.ac.kr/pdf/06.pdf>, (Sep. 2007), 5 pages.
Linderholm, Owen "Logitech Shows Cloth Keyboard for PDAs", Retrieved from: <http://www.pcworld.com/article/89084/logitech_shows_cloth_keyboard_for_pdas.html> on May 7, 2012,(Mar. 15, 2002), 5 pages.
Liu, et al., "Three-dimensional PC: toward novel forms of human-computer interaction", *In the proceedings of Three-Dimensional Video and Display: Devices and Systems* vol. CR76, Retrieved from <http://www.google.co.in/url?sa=t&rct=j&q=Three-dimensional+PC:+toward+novel+forms+of+human-computer+interaction&source=web&cd=1&ved=0CFoQFjAA&url=http%3A%2F%2Fciteseerx.ist.psu.edu%2Fviewdoc%2Fdownload%3Fdoi%3D10.1.1.32.9469%26rep%3Drep1%26,(Nov. 5, 2000), pp. 250-281.
McLellan, Charles "Eleksen Wireless Fabric Keyboard: a first look", Retrieved from: <http://www.zdnetasia.com/eleksen-wireless-fabric-keyboard-a-first-look-40278954.htm> on May 7, 2012,(Jul. 17, 2006), 9 pages.
Peli, Eli "Visual and Optometric Issues with Head-Mounted Displays", *IS & T/OSA Optics & Imaging in the Information Age, The Society for Imaging Science and Technology*, available at <http://www.u.arizona.edu/~zrui3/zhang_pHMPD_spie07.pdf>,(1996), pp. 364-369.
Post, E.R. et al., "E-Broidery: Design and Fabrication of Textile-Based Computing", IBM Systems Journal, vol. 39, Issue 3 & 4,(Jul. 2000), pp. 840-860.
Purcher, Jack "Apple is Paving the Way for a New 3D GUI for IOS Devices", Retrieved from: <http://www.patentlyapple.com/patently-apple/2012/01/apple-is-paving-the-way-for-a-new-3d-gui-for-ios-devices.html> on Jun. 4, 2012,(Jan. 12, 2012),15 pages.
Reisman, et al., "A Screen-Space Formulation for 2D and 3D Direct Manipulation", *In the proceedings of the 22nd annual ACM symposium on User interface*, Retrieved from <http://innovis.cpsc.ucalgary.ca/innovis/uploads/Courses/TableTopDetails2009/Reisman2009.pdf>,(Oct. 4, 2009), pp. 69-78.
Schoning, Johannes et al., "Building Interactive Multi-Touch Surfaces", *Journal of Graphics, GPU, and Game Tools*, vol. 14, No. 3, available at <http://www.libavg.com/raw-attachment/wiki/Multitouch/Multitouchguide_draft.pdf>,(Nov. 2009), pp. 35-55.

(56) References Cited

OTHER PUBLICATIONS

Takamatsu, Seiichi et al., "Flexible Fabric Keyboard with Conductive Polymer-Coated Fibers", In Proceedings of Sensors 2011,(Oct. 28, 2011), 4 pages.
Travis, Adrian R., et al., "Flat Projection for 3-D", *In Proceedings of the IEEE*, vol. 94 Issue: 3, Available at <http://ieeexplore.ieee.org/stamp/stamp.jsp?tp=&arnumber=1605201>,(Mar. 2006), pp. 539-549.
Yan, Jin-Ren et al., "Edge-Lighting Light Guide Plate Based on Micro-Prism for Liquid Crystal Display", *Journal of Display Technology*, vol. 5, No. 9, Available at <http://ieeexplore.ieee.org/ielx5/9425/5196834/05196835.pdf?tp=&arnumber=5196835&isnumber=5196834>,(Sep. 2009), pp. 355-357.
Yu, et al., "A New Driving Scheme for Reflective Bistable Cholesteric Liquid Crystal Displays", *Society for Information Display International Symposium Digest of Technical Papers*, Retrieved from <http://www.ee.ust.hk/~eekwok/publications/1997/bcd_sid.pdf >,(May 1997), 4 pages.
Zhang, et al., "Model-Based Development of Dynamically Adaptive Software", *In Proceedings of ICSE* 2006, Available at <http://www.irisa.fr/lande/lande/icse-proceedings/icse/p371.pdf>,(May 20, 2006), pp. 371-380.
Zhang, Rui "Design of Head Mounted Displays", Retrieved at <<http://www.optics.arizona.edu/optomech/student%20reports/2007/Design%20of%20mounteddisplays%20Zhang.pdf>>, (Dec. 12, 2007), 6 pages.
"International Search Report and Written Opinion", Application No. PCT/US2014/020050, May 9, 2014, 10 pages.
"International Search Report and Written Opinion", Application No. PCT/US2014/016654, May 16, 2014, 11 pages.
"International Search Report and Written Opinion", Application No. PCT/US2013/075180, May 6, 2014, 12 pages.
"Non-Final Office Action", U.S. Appl. No. 13/408,257, Jul. 2, 2014, 20 pages.
"Non-Final Office Action", U.S. Appl. No. 13/647,507, Jun. 19, 2014, 22 pages.
"Non-Final Office Action", U.S. Appl. No. 13/714,401, Jul. 8, 2014, 11 pages.
"Non-Final Office Action", U.S. Appl. No. 13/773,496, Jun. 23, 2014, 10 pages.
"Chinese Search Report", Application No. 201110272868.3, (Apr. 1, 2013),10 pages.
"Notice of Allowance", U.S. Appl. No. 12/882,994, (Jul. 12, 2013), 9 pages.
"PCT Search Report and Written Opinion", Application No. PCT/US2013/028479, (Jun. 17, 2013),10 pages.
"PCT Search Report", Application No. PCT/US2013/042790, (Aug. 8, 2013),9 pages.
"International Search Report and Written Opinion", Application No. PCT/US2013/042550, (Sep. 24, 2013),14 pages.
"Welcome to Windows 7" Retrieved from: <http://www.microsoft.com/en-us/download/confirmation.aspx?id=4984> on Aug. 1, 2013, (Sep. 16, 2009), 3 pages.
Prospero, Michael "Samsung Outs Series 5 Hybrid PC Tablet", Retrieved from: <http://blog.laptopmag.com/samsung-outs-series-5-hybird-pc-tablet-running-windows-8> on Oct. 31, 2013, (Jun. 4, 2012), 7 pages.
"Non-Final Office Action", U.S. Appl. No. 13/367,812, Sep. 18, 2014, 10 pages.
"Final Office Action", U.S. Appl. No. 13/773,496, Nov. 4, 2014, 11 pages.
"Final Office Action", U.S. Appl. No. 13/647,507, Oct. 27, 2014, 33 pages.
"Written Opinion", Application No. PCT/US2014/020050, Sep. 22, 2014, 6 Pages.
"International Search Report and Written Opinion", Application No. PCT/US2013/051421, Dec. 6, 2013, 10 pages.
"International Search Report and Written Opinion", Application No. PCT/US2013/063156, Dec. 5, 2013, 9 pages.
"Non-Final Office Action", U.S. Appl. No. 13/409,967, Dec. 10, 2013, 5 pages.
"Non-Final Office Action", U.S. Appl. No. 13/408,257, Dec. 5, 2013, 13 pages.
"Notice of Allowance", U.S. Appl. No. 13/409,967, Feb. 14, 2014, 4 pages.
"Restriction Requirement", U.S. Appl. No. 13/494,722, Dec. 20, 2013, 6 pages.
"Final Office Action", U.S. Appl. No. 13/408,257, Mar. 28, 2014, 17 pages.
"Foreign Office Action", CN Application No. 201320328022.1, Feb. 17, 2014, 4 Pages.
"Foreign Office Action", CN Application No. 201320328022.1, Oct. 18, 2013, 3 Pages.
"Non-Final Office Action", U.S. Appl. No. 13/492,232, Apr. 30, 2014, 9 pages.
"Non-Final Office Action", U.S. Appl. No. 13/494,722, May 9, 2014, 8 pages.
"Restriction Requirement", U.S. Appl. No. 13/367,812, Mar. 11, 2014, 6 pages.
"Final Office Action", U.S. Appl. No. 13/492,232, Nov. 17, 2014, 13 pages.
"Final Office Action", U.S. Appl. No. 13/714,401, Nov. 25, 2014, 15 pages.
"Final Office Action", U.S. Appl. No. 13/408,257, Dec. 10, 2014, 15 pages.
"Notice of Allowance", U.S. Appl. No. 13/494,722, Dec. 18, 2014, 7 pages.
"Notice of Allowance", U.S. Appl. No. 13/367,812, Jan. 30, 2015, 8 pages.
"Advisory Action", U.S. Appl. No. 13/408,257, Apr. 8, 2015, 9 pages.
"Non-Final Office Action", U.S. Appl. No. 13/492,232, Feb. 24, 2015, 12 pages.
"Non-Final Office Action", U.S. Appl. No. 13/647,507, Feb. 9, 2015, 37 pages.
"Non-Final Office Action", U.S. Appl. No. 13/714,401, Apr. 17, 2015, 14 pages.
"Final Office Action", U.S. Appl. No. 13/492,232, Jul. 10, 2015, 11 pages.
"Final Office Action", U.S. Appl. No. 13/714,401, Aug. 4, 2015, 15 pages.
"Foreign Office Action", CN Application No. 201310225788.1, Jun. 23, 2015, 14 Pages.
"Non-Final Office Action", U.S. Appl. No. 13/555,404, Aug. 17, 2015, 10 pages.
"Non-Final Office Action", U.S. Appl. No. 13/773,496, Jun. 8, 2015, 16 pages.
"Notice of Allowance", U.S. Appl. No. 13/647,507, Jun. 3, 2015, 7 pages.
"Supplemental Notice of Allowance", U.S. Appl. No. 13/647,507, Jun. 30, 2015, 2 pages.
"Supplemental Notice of Allowance", U.S. Appl. No. 13/647,507, Jul. 16, 2015, 2 pages.
"Foreign Office Action", CN Application No. 201310225788.1, Feb. 29, 2016, 11 Pages.
"Foreign Office Action", CN Application No. 201380030964.4, Feb. 14, 2016, 11 pages.
"Non-Final Office Action", U.S. Appl. No. 13/492,232, Dec. 17, 2015, 11 pages.
"Notice of Allowance", U.S. Appl. No. 13/555,404, Feb. 4, 2016, 9 pages.
"Supplemental Notice of Allowance", U.S. Appl. No. 13/555,404, Mar. 10, 2016, 2 pages.
"Final Office Action", U.S. Appl. No. 13/773,496, Oct. 29, 2015, 16 pages.
"Non-Final Office Action", U.S. Appl. No. 13/714,401, Dec. 3, 2015, 16 pages.
"Supplemental Notice of Allowance", U.S. Appl. No. 13/647,507, Aug. 27, 2015, 2 pages.
"Examiner's Answer to Appeal Brief", U.S. Appl. No. 13/408,257, Nov. 6, 2015, 23 pages.

(56) References Cited

OTHER PUBLICATIONS

"Corrected Notice of Allowance", U.S. Appl. No. 13/555,404, May 2, 2016, 2 pages.
"Extended European Search Report", EP Application No. 13861059.7, Apr. 29, 2016, 8 pages.
"Final Office Action", U.S. Appl. No. 13/492,232, May 25, 2016, 12 pages.
"Final Office Action", U.S. Appl. No. 13/714,401, May 12, 2016, 17 pages.
"Non-Final Office Action", U.S. Appl. No. 13/773,496, Jun. 29, 2016, 17 pages.
"Restriction Requirement", U.S. Appl. No. 14/641,831, Jun. 14, 2016, 6 pages.
"Foreign Office Action", CN Application No. 201310225788.1, Sep. 1, 2016, 8 pages.
"Foreign Office Action", CN Application No. 201380030964.4, Sep. 1, 2016, 11 pages.
"Non-Final Office Action", U.S. Appl. No. 14/641,831, Nov. 3, 2016, 11 pages.
"Notice of Allowance", U.S. Appl. No. 13/714,401, Aug. 22, 2016, 8 pages.
"Examiner's Answer to Appeal Brief", U.S. Appl. No. 13/492,232, Feb. 9, 2017, 5 pages.
"Final Office Action", U.S. Appl. No. 13/773,496, Dec. 27, 2016, 18 pages.
"Foreign Notice of Allowance", CN Application No. 201380030964.4, Dec. 7, 2016, 4 pages.
"Foreign Office Action", EP Application No. 13728072.3, Jan. 2, 2017, 4 pages.
"PTAB Decision", U.S. Appl. No. 13/408,257, Jan. 30, 2017, 8 pages.

* cited by examiner

ASYMMETRIC ABERRATION CORRECTING LENS

BACKGROUND

The configuration of computing devices is ever increasing. For example, use of computing devices expanded with the advent of the desktop personal computer. Configurations continued to expand and thus so too did the pervasiveness of computing devices in everyday life, such as from the desktop computer to laptop computers, netbooks, mobile communications devices such as mobile phones and tablet computers, and so on.

As these configurations continue to expand, there is an increasing focus in some instances on making devices having not only a thin form factor but also a large display area and being capable of supporting robust functionality. Functionality associated with touch input, for instance, is becoming increasingly desired across the spectrum of display capable devices, e.g., mobile phones and televisions alike. Conventional optical components for enabling touch capability, however, could be inadequate for use by display devices having these new configurations. For example, conventional optical components, if utilized in display devices having these new configurations, could introduce aberrations into images collected by a display device. Collected images or portions thereof that include these aberrations may not be suitable to enable touch capability or other natural user interface functionality.

SUMMARY

An asymmetric aberration correcting lens is described. In one or more implementations, a lens includes multiple lens elements that are configured to focus an image from an asymmetric imaging component. The multiple lens elements may include an optical lens element that is configured to redirect the image so that it passes through the lens. Further, the multiple lens elements may include an asymmetric element configured to correct aberration caused by the asymmetric imaging component. For example, the asymmetric element may be configured as an off-axis lens element to correct off-axis aberration in an image. In some implementations, the multiple lens elements may include more than one asymmetric element to correct aberration caused by the asymmetric imaging component.

In one or more implementations, images are collected by an imaging component that introduces asymmetric aberration into the images. The asymmetric aberration may be removed from the image by a lens that uses an asymmetric lens element to compensate for the asymmetric aberration. After the asymmetric aberration is removed using the lens, the images may be detected by a sensor and converted into image data. Additionally, the images collected through the imaging component may be displayed to exclude the asymmetric aberration introduced by the imaging component.

In one or more implementations, a device includes an asymmetric imaging component that is configured to collect images but introduces aberration into images that pass through. The device also includes a lens that has an asymmetric lens element configured to correct the images by removing the aberration introduced by the asymmetric imaging component. An imaging sensor of the device may be configured to detect the corrected images.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items. Entities represented in the figures may be indicative of one or more entities and thus reference may be made interchangeably to single or plural forms of the entities in the discussion.

DETAILED DESCRIPTION

Overview

Figure 1:
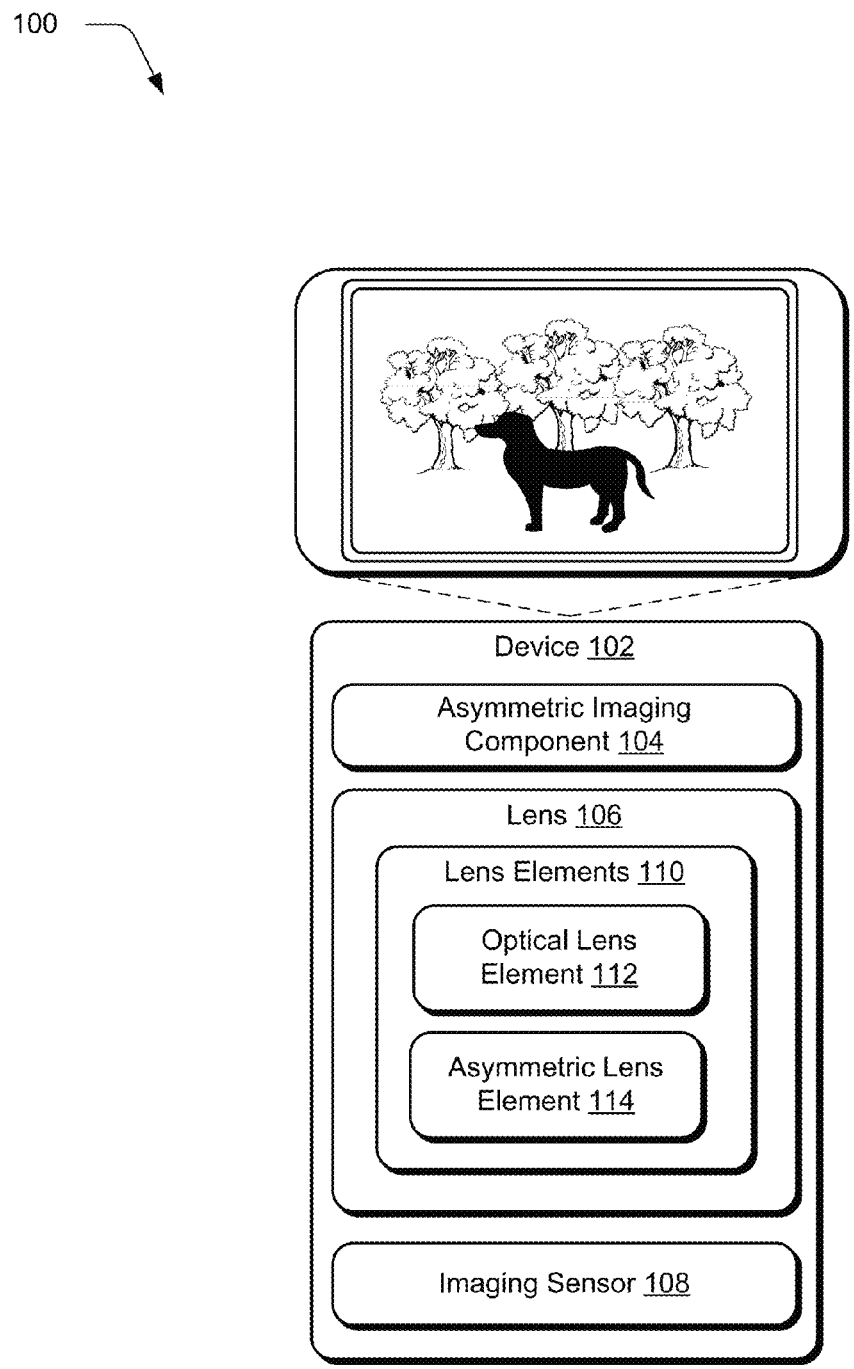
FIG. 1 is an illustration of an environment in an example implementation that is operable to employ an asymmetric aberration correcting lens as described herein.

As previously described, computing devices may assume a variety of configurations and be employed for a variety of different uses. However, some of these configurations were conventionally less suited for supporting some functionality than other configurations. For example, some conventional display capable devices (e.g., televisions) were configured to have a thin form factor but also a large display area. However, these larger display capable devices typically were not configured to support some natural user interface (NUI) techniques, such as touch capability. As the desire to support robust functionality continued to expand across the spectrum of display capable devices (e.g., mobile devices and televisions alike), limitations of conventional optical components could restrict inclusion of some NUI techniques to a fraction of such devices.

An asymmetric aberration correcting lens is described. In one or more implementations, a lens is designed for use in conjunction with an imaging component to collect and focus images for detection by a sensor, e.g., an optical sensor. In particular, the lens is designed to remove aberration introduced into images that pass through the imaging component, such as aberration introduced by an asymmetric imaging component.

The imaging component may utilize wedge optics to project and/or capture images e.g., it may be configured as a wedge light guide, a gapless wedge, and so on. To project images using a wedge light guide or a gapless wedge, rays of light comprising images may be pointed at a thick end of the wedge. The rays of light that enter the thick end of a wedge propagate toward the thin end by total internal reflection and reflect off the surfaces of the wedge until a critical angle is reached. When the critical angle is reached, the rays of light emerge from the surface. In this way, images may be projected via the surface of the wedge. By moving an image source from behind a display screen, wedge optics can reduce a depth associated with image projection. This may in turn enable devices to be designed that have thinner form factors.

Wedge optics may also be used to capture images of objects via the surface of the wedge. To capture images via the surface, a video camera or other optical sensor may be pointed into the thick end of the wedge. The video camera may capture the rays of light that pass through the wedge in the opposite direction of those that are used to project images via the surface. Specifically, the rays of light that enter the surface propagate toward and emerge from the thick end of the wedge.

Wedge-shaped optical components such as wedge light guides and gapless wedges, however, are not symmetrical in relation to an optical axis of the system (i.e., they are asymmetrical). Although these asymmetric imaging components may be useful to reduce a depth associated with displaying and capturing images, such components may also introduce aberration into the images that are to be displayed and captured. For example, asymmetric imaging components may produce large aberrations throughout a field of view of these images. However, images including this aberration may be of unacceptable display quality and/or may not be suitable for enabling some natural user interface (NUI) techniques.

Some approaches for removing aberration introduced by asymmetric imaging components used a conventional lens, in which optical elements are symmetrical about an optical axis of the lens. Approaches using a conventional lens (such as tilting the lens, reducing an aperture size of the lens, tilting a sensor configured to detect images, or some combination of these approaches), however, oftentimes caused light to be lost from the images and/or aberration to be reduced non-uniformly throughout the images. As a result, conventional approaches may only be suitable for low-resolution applications.

In contrast to a conventional lens, the asymmetric aberration correcting lens may be configured to include an asymmetric lens element. Unlike conventional lenses, a lens including an asymmetric lens element may correct aberration caused by an asymmetric imaging component without tilting the lens, without reducing an aperture size of the lens, and without tilting a sensor configured to detect the images. As a result, light may not be lost from the images and the aberration may be corrected uniformly throughout the images. Furthermore, the asymmetric aberration correcting lens may enable collection of images for high-resolution applications, such as for video conferencing techniques in which users have the experience of looking through a window at one another.

In the following discussion, an example environment is first described that may employ the techniques described herein. Example procedures are then described which may be performed in the example environment as well as other environments. Consequently, performance of the example procedures is not limited to the example environment and the example environment is not limited to performance of the example procedures.

Example Environment

FIG. 1 is an illustration of an environment 100 in an example implementation that is operable to employ techniques described herein. The illustrated environment 100 includes an example of a computing device 102 having an asymmetric imaging component 104, a lens 106, and an imaging sensor 108.

The computing device 102 may be configured in a variety of ways. For example, the computing device 102 may be configured with display capabilities. Examples of display capable device configurations may be found in desktop and laptop computers, televisions and other display monitors, table-top computers, electronic billboards, mobile phones, tablet computers, portable game devices, music players, and so on. Thus, the computing device 102 may range from full resource devices with substantial memory and processor resources to low-resource devices with limited memory and/or processing resources.

The lens 106 of the computing device 102 is illustrated as including multiple lens elements 110. The multiple lens elements 110 are configured to focus images from the asymmetric imaging component 104. Some of these lens elements 110, such as optical lens element 112 may be configured to redirect images so that the images pass through the lens 106. Further, optical lens element 112 may be configured as a symmetric lens element that is rotationally symmetrical about an optical axis of the lens 106.

Figure 3:
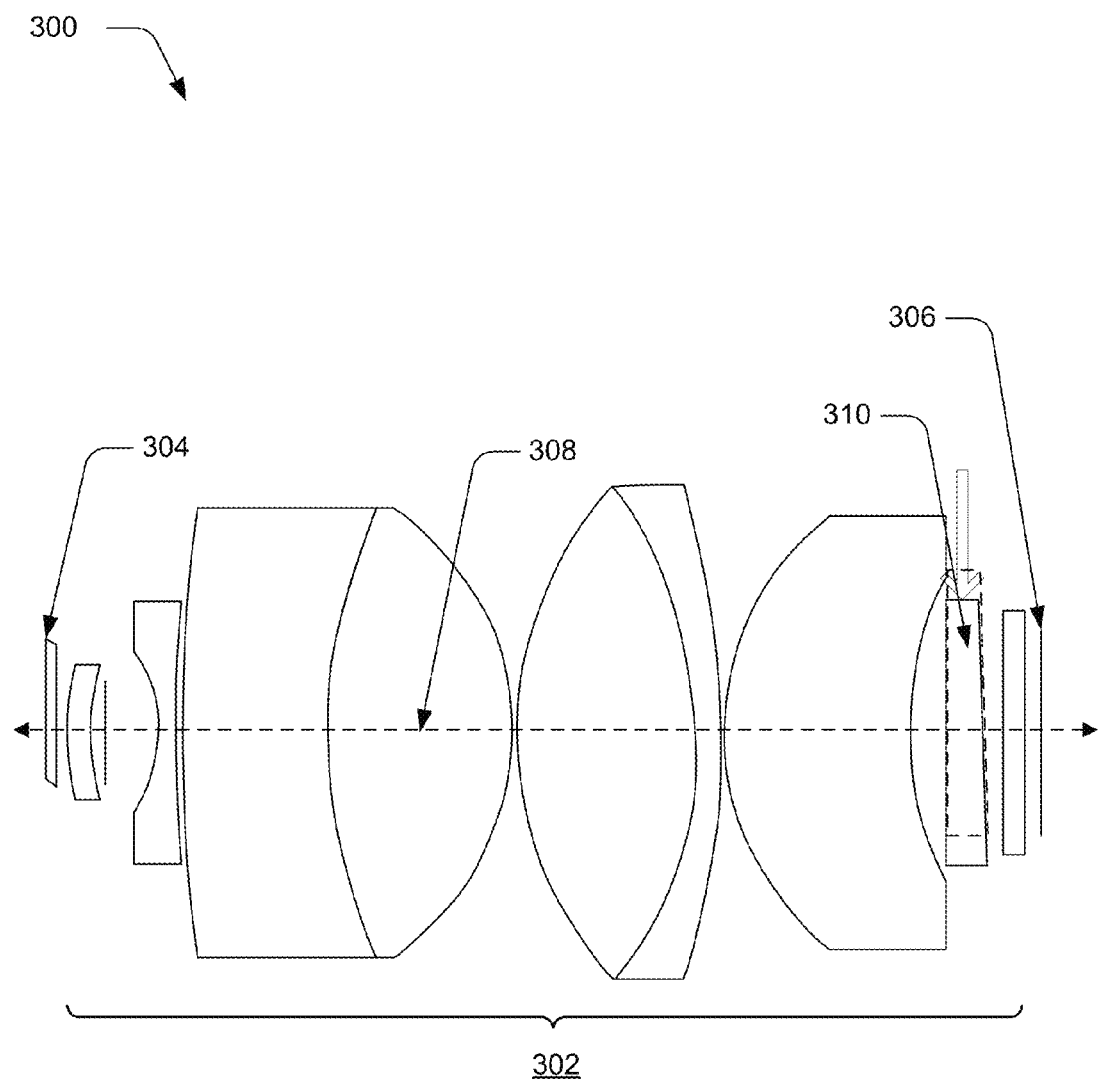
FIG. 3 depicts device components in an example implementation in which the asymmetric aberration correcting lens of FIG. 2 is shown in greater detail.

The illustrated configuration also shows that lens elements 110 may include an asymmetric lens element 114 that is configured to correct aberration in images caused by the asymmetric imaging component 104. Although only one asymmetric lens element 114 is shown in the illustrated example, multiple asymmetric lens elements 114 may be used to correct aberration introduced by the asymmetric imaging component 104. In contrast to a symmetrical lens element, the asymmetric lens element 114 may not be symmetrical relative to an optical axis of the lens 106. As illustrated in FIG. 3, for example, the asymmetric lens element 114 may be shifted in a direction perpendicular to the optical axis of the lens 106 so that it is "off-axis" relative to other lens elements.

Different types of asymmetric lens elements 114 may be configured to correct particular aberration caused by the asymmetric imaging component 104. In one or more implementations, the asymmetric imaging component 104 may be configured as a wedge that produces aberration in images that emerge from a thick end of the wedge. For example, the wedge may produce a severe field curvature and astigmatism in the images that is asymmetric about an optical axis of the lens 106 (i.e., off-axis aberration). The asymmetric lens element 114, however, may be shifted off-axis to compensate for the field curvature and thereby flatten the curvature and reduce the astigmatism in the images that is symmetrical about the optical axis of the lens 106. Accordingly, an asymmetric lens element 114 configured as an off-axis lens element may be used to correct off-axis aberration in the images throughout an entire field of view.

In one or more implementations, the asymmetric lens element 114 may be configured as a freeform lens element to compensate for freeform aberration produced by the asymmetric imaging component 104. Other configurations of the asymmetric lens element 114 used to compensate for other types of aberration are also contemplated.

As previously described, multiple asymmetric lens elements 114 may be included in the lens 106, such as multiple different types of asymmetric lens elements to compensate for different types of aberration. Additionally or alternatively, multiple different asymmetric lens elements may be included in the lens 106 to compensate for different portions of the aberration present in the entirety of the field of view.

For example, the lens 106 may include multiple asymmetric lens elements that are shifted in different directions off the optical axis of the lens 106.

As described above, the computing device 102 is also illustrated as including an imaging sensor 108. The imaging sensor 108 may be configured to detect images, such as the images that are corrected using the lens 106. The imaging sensor 108 may be positioned in the computing device 102 such that images that emerge from the asymmetric imaging component 104 first pass through the lens 106 and then emerge from the lens 106 for detection by the imaging sensor 108. Consequently, images detected by the imaging sensor 108 may exclude the aberration introduced by the asymmetric imaging component 104.

Figure 2:
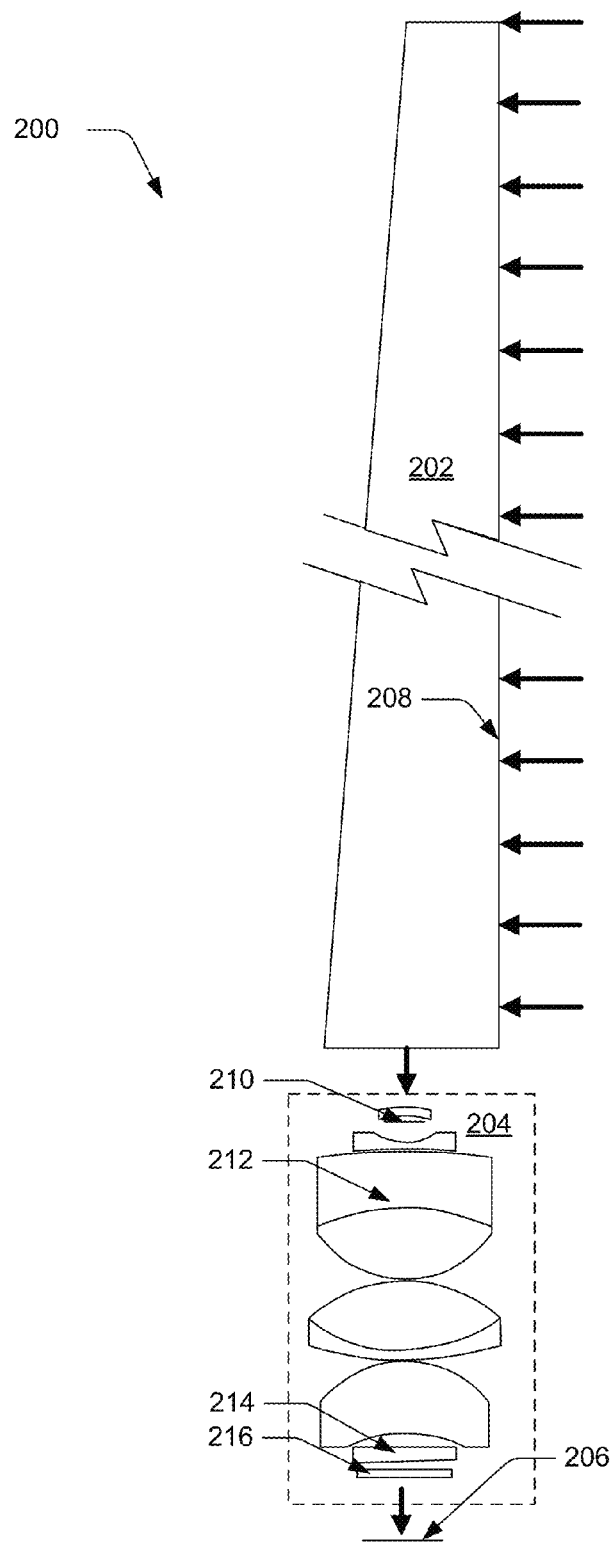
FIG. 2 depicts device components in an example implementation that are operable to employ techniques described herein.

FIG. 2 depicts device components in an example implementation 200 that are operable to employ techniques described herein. The illustrated device components include an asymmetric imaging component 202, an asymmetric aberration correcting lens 204, and a sensor 206, which may correspond to the asymmetric imaging component 104, the lens 106 and the imaging sensor 108 of FIG. 1 respectively.

In the illustrated example, the asymmetric imaging component 202 is configured as a wedge. The asymmetric imaging component 202 may for example be configured as a gapless wedge. In the illustrated example, a plurality of arrows are depicted that point toward a surface 208 of the asymmetric imaging component 202. The illustrated arrows may be representative of images that are collected and funneled through the asymmetric imaging component 202.

The asymmetric imaging component 202 may be configured to collect images of objects that contact the surface 208 as well as to collect images of objects that do not contact the surface 208. In some implementations, the asymmetric imaging component 202 may be configured as a touch surface that images objects directly in contact with the surface 208. In other implementations, the asymmetric imaging component 202 may be configured to image objects that contact a separate touch surface (not shown) that is positioned adjacent to but not contacting the surface 208. Additionally, the asymmetric imaging component 202 may be configured to image objects that are positioned a distance away from the surface 208.

In any case, the asymmetric imaging component 202 is configured to funnel images that enter through the surface 208 toward the thick end of the wedge by internal reflection. At the thick end, the funneled images emerge from an exit portion of the asymmetric imaging component 202. In the illustrated example, an arrow is depicted that points away from the thick end of the asymmetric imaging component 202. This arrow indicates the funneled images emerging from the exit portion. As discussed in relation to the asymmetric imaging component 104 of FIG. 1, however, the asymmetric imaging component 202 may produce aberration in the funneled images.

Continuing with the discussion of the illustrated example, the arrow that indicates images emerging from the exit portion of the asymmetric imaging component 202 also indicates these images enter the lens 204 through an entrance portion of the lens 204. Although the lens 204 and the asymmetric imaging component 202 are not shown touching in FIG. 2, these components may be arranged such that they substantially touch one another. In any case, the lens and the asymmetric imaging component 202 may be arranged so that an entrance portion of the lens 204 substantially covers an exit portion of the asymmetric imaging component 202.

In the illustrated example, the lens 204 is depicted within a dashed line and includes multiple optical elements. It is to be appreciated that the lens 204 may include more or fewer optical elements than shown in FIG. 2. The depicted optical elements include an aperture 210, multiple lens elements (e.g., optical lens element 212), asymmetric lens element 214, and a piece of cover glass 216. The optical elements of the lens 204 may be configured in combination to focus the images from the asymmetric imaging component 202 for detection by the sensor 206. As discussed in more detail above, the optical elements of the lens 204 may be configured to remove the aberration introduced by the asymmetric imaging component 202. In addition, the optical elements of the lens 204 may be configured to remove the aberration without tilting the lens 204, without stopping (reducing the size of) the aperture 210, and without tilting the sensor 206.

In FIG. 2 another arrow is depicted between the piece of cover glass 216 and the sensor 206. This arrow is indicative of corrected images (e.g., images without aberration introduced by the asymmetric imaging component 202) that emerge from the lens 204 for detection by the sensor 206.

FIG. 3 depicts an example implementation 300 in which the asymmetric aberration correcting lens of FIG. 2 is shown in greater detail. In this example, the lens 302 is illustrated between portions of an asymmetric imaging component 304 and an imaging sensor 306. The lens 302 is also depicted relative to a dashed line that is representative of an optical axis 308 of the lens 302.

The optical elements of the lens 302, other than asymmetric lens element 310, may be arranged so that they centered about the optical axis 308. In one or more implementations, these optical elements may be rotationally symmetrical about the optical axis 308.

The asymmetric lens element 310, however, may be positioned so that it is asymmetrical relative to the optical axis 308. In the illustrated example, the asymmetric lens element 310 is shifted in a direction that is substantially perpendicular to the optical axis 308 (indicated by the arrow). By shifting the asymmetric lens element 310 off of the optical axis 308, aberration from the asymmetric imaging component 304 may be removed. For example, shifting the asymmetric lens element 310 in the y-direction by 10 millimeters relative to the optical axis 308 may be effective to compensate for aberration caused by an asymmetric lens element. Although only one asymmetric element is shown in this example, the lens 302 may include multiple asymmetric lens elements. In one or more embodiments, these other asymmetric lens elements may be shifted in directions that are different from that of the asymmetric lens element 310.

Example Procedures

The following discussion describes asymmetric aberration correction techniques that may be implemented utilizing the previously described systems and devices. Aspects of each of the procedures may be implemented in hardware, firmware, or software, or a combination thereof. The procedures are shown as a set of blocks that specify operations performed by one or more devices and are not necessarily limited to the orders shown for performing the operations by the respective blocks. In portions of the following discussion, reference will be made to the environment 100 of FIG. 1.

Figure 4:
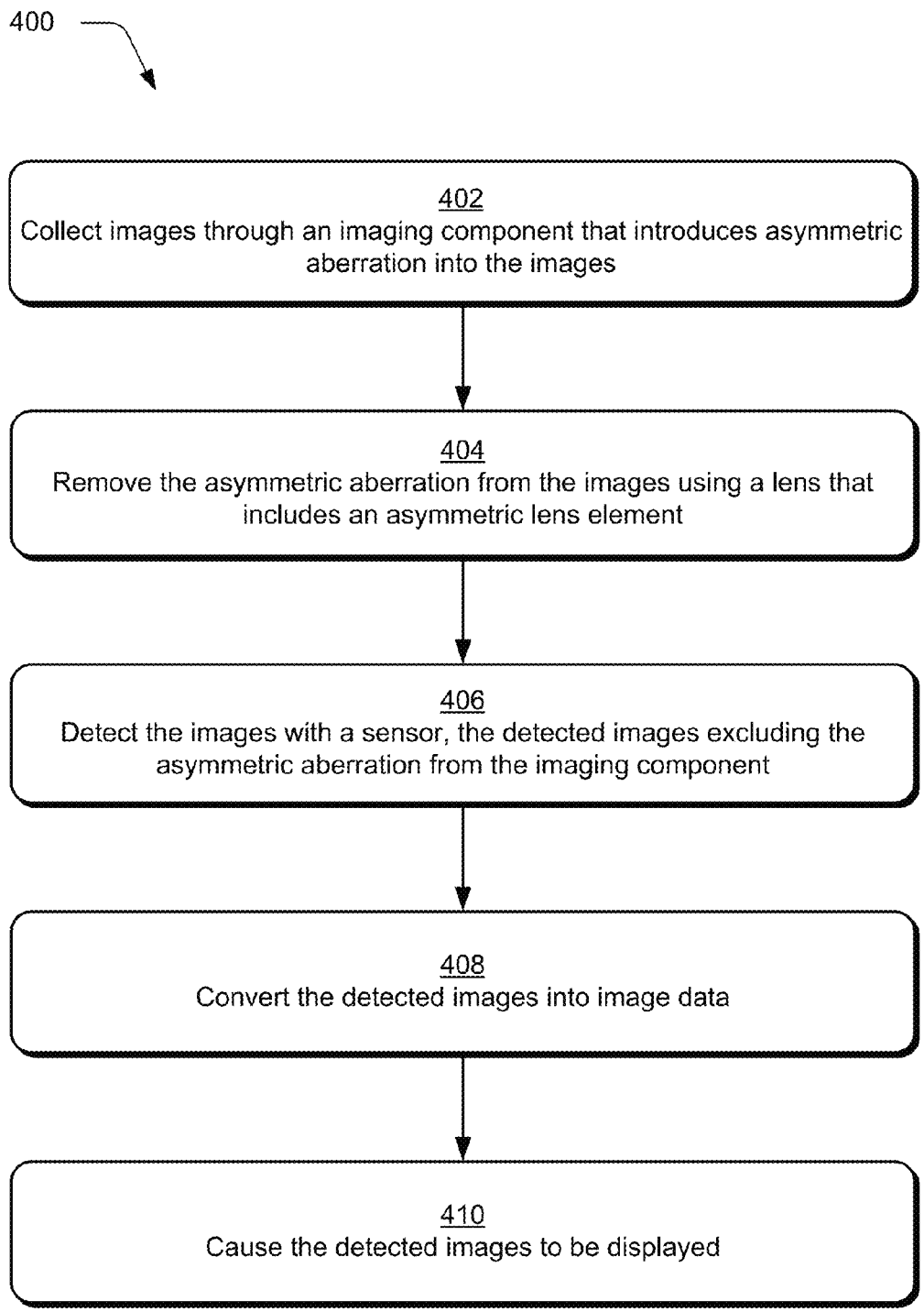
FIG. 4 is a flow diagram depicting a procedure in an example implementation in which an asymmetric aberration correcting lens is used to correct asymmetric aberration introduced into an image by an imaging component.

FIG. 4 depicts a procedure 400 in an example implementation in which an asymmetric aberration correcting lens is used to correct asymmetric aberration introduced into an image by an imaging component. Images are collected through an imaging component that introduces asymmetric aberration into the images (block 402). For example, the asymmetric imaging component 104 of the computing device 102 may collect images to support natural user interface (NUI) techniques for the device 102. However, the asymmetric imaging component 104 may introduce asymmetric aberration into images that pass through. As discussed previously, if this aberration is not removed, the collected images or portions thereof may be unsuitable for enabling touch capability and other NUI techniques.

Aberration introduced by the imaging component is removed using a lens that includes an asymmetric lens element (block 404). For example, the lens 106 may be used to remove asymmetric aberration introduced by the asymmetric imaging component 104 of device 102. In this example, the asymmetric lens element 114 included in the lens 106 may correspond to a specific type of aberration introduced by the asymmetric imaging component 104. To remove off-axis aberration, for instance, an asymmetric lens element 114 configured as an off-axis lens element may be included. Similarly, to remove freeform aberration an asymmetric lens element 114 configured as freeform lens element may be included.

Images are detected by a sensor that exclude the aberration introduced by the imaging component (block 406). For example, images that are funneled through the asymmetric imaging component 104 may pass through the lens 106, and then be detected by the imaging sensor 108. These images may exclude the aberration introduced by the asymmetric imaging component 104 because it is removed when the images pass through the lens 106.

In one or more implementations, the detected images are converted into image data (block 408). For example, one or more components (not shown) of computing device 102 may convert the images detected by the imaging sensor 108 into image data (e.g., image files, video files, streaming video, and so on).

Once converted into image data, the detected images may be displayed (block 410). For example, the images detected by the imaging sensor 108 may be displayed using display capabilities of computing device 102. In one or more implementations, these images may be displayed via the asymmetric imaging component 104. Additionally or alternatively, these images may be communicated to a different computing device and displayed by the different computing device.

Example System

Figure 5:
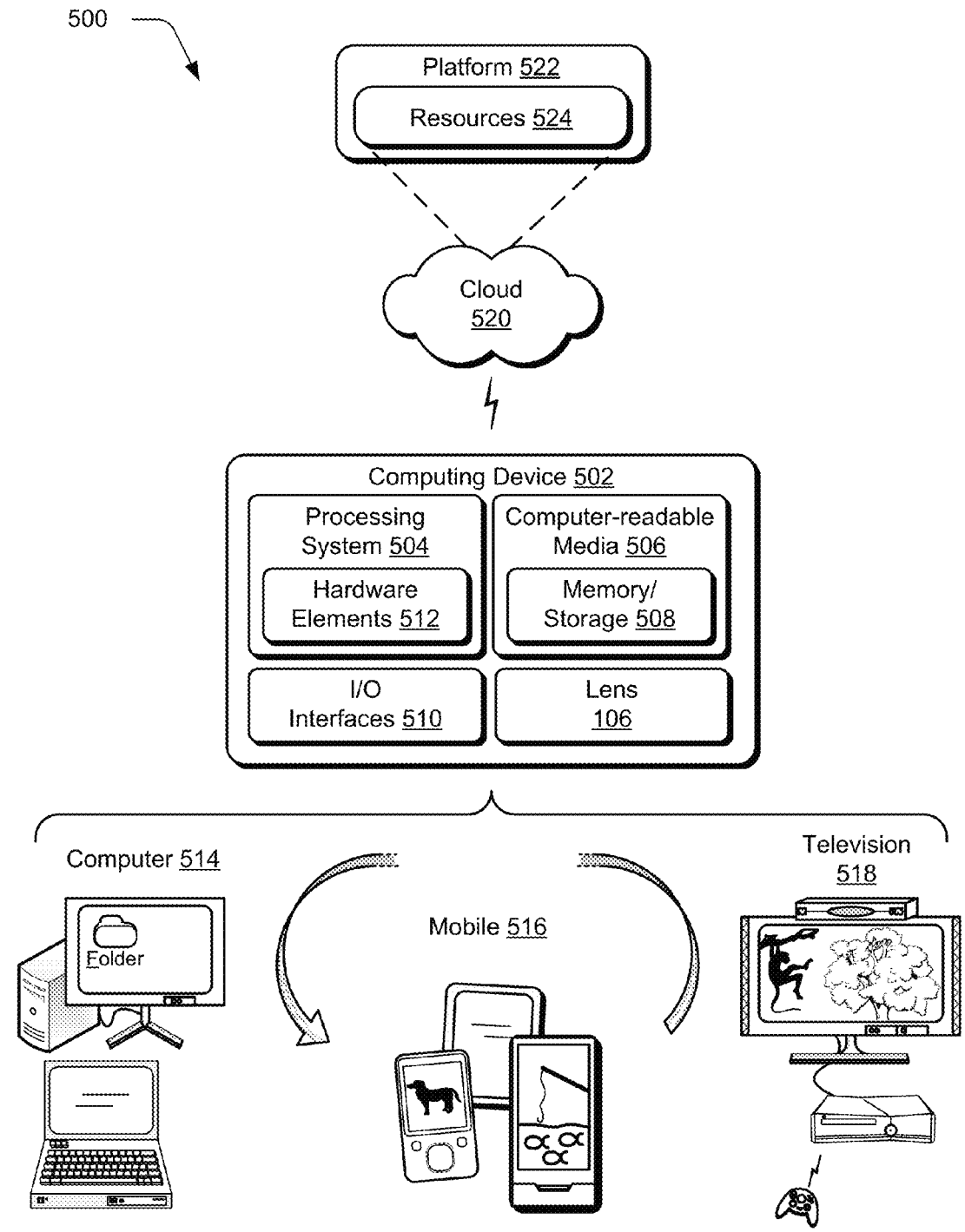
FIG. 5 illustrates various components of an example system that can be employed to implement aspects of the techniques described herein.

FIG. 5 illustrates an example system generally at 500 that includes an example computing device 502 that is representative of one or more computing systems and/or devices that may implement the various techniques described herein. The computing device 502 may, for example, be configured to remove aberration from images through use of a lens 106 that has at least one asymmetric lens element. The lens 106 may be configured to remove aberration introduced by an asymmetric imaging component 104 as described above and previously.

The example computing device 502 includes a processing system 504 that may incorporate one or more processors or processing devices, one or more computer-readable media 506 which may include one or more memory and/or storage components 508, and one or more input/output (I/O) interfaces 510 for input/output (I/O) devices. Computer-readable media 506 and/or one or more I/O devices may be included as part of, or alternatively may be coupled to, the computing device 502. As illustrated, the processing system 504 may also include one or more hardware elements 512 representative of functionality to implement at least some aspects of the procedures and techniques described herein in hardware.

Although not shown, the computing device 502 may further include a system bus or data transfer system that couples the various components one to another. A system bus can include any one or combination of different bus structures, such as a memory bus or memory controller, a peripheral bus, a universal serial bus, and/or a processor or local bus that utilizes any of a variety of bus architectures.

The processing system 504, processors, and hardware elements 512 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions. The memory/storage component 508 represents memory/storage capacity associated with one or more computer-readable media. The memory/storage component 508 may include volatile media (such as random access memory (RAM)) and/or nonvolatile media (such as read only memory (ROM), Flash memory, optical disks, magnetic disks, and so forth). The memory/storage component 508 may include fixed media (e.g., RAM, ROM, a fixed hard drive, etc.) as well as removable media (e.g., a Flash memory drive, a removable hard drive, an optical disk, and so forth).

Input/output interface(s) 510 allow a user to enter commands and information to computing device 502, and also allow information to be presented to the user and/or other components or devices using various input/output devices. Examples of input devices include a keyboard, a cursor control device (e.g., a mouse), a microphone (e.g., which may be configured to receive voice input), a scanner, touch functionality (e.g., capacitive or other sensors that are configured to detect physical touch), a camera (e.g., which may employ visible or non-visible wavelengths such as infrared frequencies to recognize movement as gestures), and so forth. Examples of output devices include a display device (e.g., a monitor or projector), speakers, a printer, a network card, tactile-response device, and so forth. Thus, the computing device 502 may be configured in a variety of ways to support user interaction.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by the computing device 502. By way of example, and not limitation, computer-readable media may include "computer-readable storage media" and "computer-readable signal media."

"Computer-readable storage media" may refer to media and/or devices that enable persistent and/or non-transitory storage of information in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" may refer to a signal-bearing medium that is configured to transmit instructions to the hardware of the computing device 502, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 512 and computer-readable media 506 are representative of modules, programmable device logic and/or fixed device logic implemented in a hardware form that may be employed in some embodiments to implement at least some aspects of the techniques described herein, such as to perform one or more instructions. Hardware may include components of an integrated circuit or on-chip system, an application-specific integrated circuit (ASIC), a field-programmable gate array (FPGA), a complex programmable logic device (CPLD), and other implementations in silicon or other hardware. In this context, hardware may operate as a processing device that performs program tasks defined by instructions and/or logic embodied by the hardware as well as a hardware utilized to store instructions for execution, e.g., the computer-readable storage media described previously.

Combinations of the foregoing may also be employed to implement various techniques described herein. Accordingly, software, hardware, or executable modules may be implemented as one or more instructions and/or logic embodied on some form of computer-readable storage media and/or by one or more hardware elements 512. The computing device 502 may be configured to implement particular instructions and/or functions corresponding to the software and/or hardware modules. Accordingly, implementation of a module that is executable by the computing device 502 as software may be achieved at least partially in hardware, e.g., through use of computer-readable storage media and/or hardware elements 512 of the processing system 504. The instructions and/or functions may be executable/operable by one or more articles of manufacture (for example, one or more computing devices 502 and/or processing systems 504) to implement techniques, modules, and examples described herein.

As further illustrated in FIG. 5, the example system 500 enables ubiquitous environments for a seamless user experience when running applications on a personal computer (PC), a television device, and/or a mobile device. Services and applications run substantially similar in all three environments for a common user experience when transitioning from one device to the next while utilizing an application, playing a video game, watching a video, and so on.

In the example system 500, multiple devices are interconnected through a central computing device. The central computing device may be local to the multiple devices or may be located remotely from the multiple devices. In one embodiment, the central computing device may be a cloud of one or more server computers that are connected to the multiple devices through a network, the Internet, or other data communication link. In one embodiment, this interconnection architecture enables functionality to be delivered across multiple devices to provide a common and seamless experience to a user of the multiple devices. Each of the multiple devices may have different physical requirements and capabilities, and the central computing device uses a platform to enable the delivery of an experience to the device that is both tailored to the device and yet common to all devices. In one embodiment, a class of target devices is created and experiences are tailored to the generic class of devices. A class of devices may be defined by physical features, types of usage, or other common characteristics of the devices.

In various implementations, the computing device 502 may assume a variety of different configurations, such as for computer 514, mobile 516, and television 518 uses. Each of these configurations includes devices that may have generally different constructs and capabilities, and thus the computing device 502 may be configured according to one or more of the different device classes. For instance, the computing device 502 may be implemented as the computer 514 class of a device that includes a personal computer, desktop computer, a multi-screen computer, laptop computer, netbook, and so on.

The computing device 502 may also be implemented as the mobile 516 class of device that includes mobile devices, such as a mobile phone, portable music player, portable gaming device, a tablet computer, a multi-screen computer, and so on. The computing device 502 may also be implemented as the television 518 class of device that includes devices having or connected to generally larger screens in casual viewing environments. These devices include televisions, set-top boxes, gaming consoles, and so on. The techniques described herein may be supported by these various configurations of the computing device 502 and are not limited to the specific examples the techniques described herein.

The cloud 520 includes and/or is representative of a platform 522 for resources 524. The platform 522 abstracts underlying functionality of hardware (e.g., servers) and software resources of the cloud 520. The resources 524 may include applications and/or data that can be utilized while computer processing is executed on servers that are remote from the computing device 502. Resources 524 can also include services provided over the Internet and/or through a subscriber network, such as a cellular or Wi-Fi network.

The platform 522 may abstract resources and functions to connect the computing device 502 with other computing devices. The platform 522 may also serve to abstract scaling of resources to provide a corresponding level of scale to encountered demand for the resources 524 that are implemented via the platform 522. Accordingly, in an interconnected device embodiment, implementation of the functionality described herein may be distributed throughout the system 500. For example, the functionality may be implemented in part on the computing device 502 as well as via the platform 522 that abstracts the functionality of the cloud 520.

CONCLUSION

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:

1. A lens comprising:
    multiple lens elements configured to focus an image from an asymmetric imaging component, the multiple lens elements including:
        at least one optical lens element configured to redirect the image so that the image passes through the lens; and
        at least one asymmetric lens element configured to at least partially correct aberration in the image caused by the asymmetric imaging component, the at least one asymmetric lens element configured to at least partially remove the aberration from the image without reducing a size of an aperture of the lens and without tilting the lens relative to an axis that runs substantially through center portions of said asymmetric lens element.

2. A lens as described in claim 1, wherein the aberration is present in a field of view of the image and the at least one asymmetric element is configured to at least partially correct the aberration substantially throughout an entirety of the field of view.

3. A lens as described in claim 1, wherein one or more of the multiple lens elements other than the at least one asymmetric element are rotationally symmetrical around an optical axis that runs substantially through center portions of said lens elements.

4. A lens as described in claim 1, wherein the at least one asymmetric element is shifted in a direction that is substantially perpendicular to an optical axis that runs substantially through center portions of the other lens elements.

5. A lens as described in claim 1, wherein the at least one asymmetric element comprises an off-axis lens element that is configured to at least partially correct off-axis aberration in the image.

6. A lens as described in claim 1, wherein the at least one asymmetric element comprises a freeform lens element that is configured to correct freeform aberration in the image.

7. A lens as described in claim 1, wherein the at least one asymmetric lens element is configured to at least partially remove the aberration from the image for detection by an imaging sensor without tilting the imaging sensor relative to the axis.

8. A device comprising:
    an asymmetric imaging component configured to collect an image but introduces aberration into an image that passes through the asymmetric imaging component, the asymmetric imaging component having a wedge that is configured to funnel collected images to an exit portion of the asymmetric imaging component;
    an imaging sensor configured to detect the image; and
    a lens comprising at least one asymmetric lens element configured to at least partially remove the aberration from the image, the lens disposed about an axis that runs between the asymmetric imaging component and the imaging sensor and the at least one asymmetric lens element is configured to at least partially remove the aberration from the image without tilting the lens relative to the axis.

9. A device as described in claim 8, wherein:
    the asymmetric imaging component has an exit portion through which the image emerges from the asymmetric imaging component and the lens has an entrance portion through which the image enters the lens; and
    the asymmetric imaging component and the lens are arranged such that the exit portion of the asymmetric imaging component is substantially covered by the entrance portion of the lens.

10. A device as described in claim 8, wherein the wedge is a gapless wedge configured to image objects that contact a touch surface of the gapless wedge.

11. A device as described in claim 8, wherein the asymmetric imaging component is configured to collect images of an object that touches a touch surface of the device.

12. A device as described in claim 8, wherein the asymmetric imaging component is configured to collect images of an object that does not touch a touch surface of the device.

13. A device as described in claim 8, wherein the lens includes an aperture and the at least one asymmetric lens element is configured to at least partially remove the aberration from the image without reducing a size of the aperture.

14. A device as described in claim 8, wherein the at least one asymmetric lens element is configured to at least partially remove the aberration from the image for detection by the imaging sensor without tilting the imaging sensor relative to the axis.

15. A device as described in claim 8, wherein the device is a mobile phone or a tablet computer.

16. A device as described in claim 8, wherein the device is a display monitor.

17. A method comprising:
    collecting images through an imaging component that introduces asymmetric aberration into the images, the asymmetric imaging component having a wedge that is configured to funnel collected images to an exit portion of the asymmetric imaging component;
    removing the asymmetric aberration from the images using a lens that includes an asymmetric lens element, the lens disposed about an axis that runs between the asymmetric lens element and a sensor and the asymmetric lens element configured to at least partially remove the aberration without tilting the sensor relative to the axis; and
    detecting the images with the sensor, the detected images excluding the asymmetric aberration from the imaging component.

18. A method as described in claim 17, further comprising converting the detected images into image data.

19. A method as described in claim 17, further comprising causing the detected images to be displayed.

20. A method as described in claim 17, wherein the aberration is present in a field of view of the images and the at least one asymmetric lens element is configured to at least partially correct the aberration substantially throughout an entirety of the field of view.

* * * * *